(12) United States Patent
Hanrahan et al.

(10) Patent No.: US 7,850,389 B2
(45) Date of Patent: Dec. 14, 2010

(54) TOLERANCE RING HAVING VARIOUS END TAB DESIGNS TO PREVENT INTERLOCKING

(75) Inventors: Kevin P. Hanrahan, Santa Barbara, CA (US); Ryan J. Schmidt, Santa Barbara, CA (US); David D. Dexter, Buellton, CA (US); Damon D. Brink, Goleta, CA (US)

(73) Assignee: IntriPlex Technologies, Inc., Santa Barbara, CA (US)

( * ) Notice: Subject to any disclaimer, the term of this patent is extended or adjusted under 35 U.S.C. 154(b) by 0 days.

(21) Appl. No.: 11/504,161

(22) Filed: Aug. 15, 2006

(65) Prior Publication Data

US 2008/0043374 A1 Feb. 21, 2008

(51) Int. Cl.
*F16B 7/04* (2006.01)
*G11B 21/02* (2006.01)

(52) U.S. Cl. .................... 403/372; 360/265.6

(58) Field of Classification Search ............... 403/367, 403/371, 372; 411/520, 521; 384/535, 581; 360/97.02, 265.2, 265.6, 266.1
See application file for complete search history.

(56) References Cited

U.S. PATENT DOCUMENTS

| | | | |
|---|---|---|---|
| 1,662,544 A | 3/1928 | Solenberger | |
| 2,325,616 A * | 7/1943 | Landweber | 114/244 |
| 2,628,113 A | 2/1953 | Jones | |
| 2,886,354 A | 5/1959 | Bjorklund | |
| 2,897,026 A | 7/1959 | Haller et al. | |
| 2,931,412 A | 4/1960 | Wing | |
| 2,950,937 A | 8/1960 | Bedford, Jr. | |
| 3,061,386 A | 10/1962 | Dix et al. | |
| 3,125,397 A | 3/1964 | McGrath | |
| 3,142,887 A | 8/1964 | Hulck et al. | |
| 3,145,547 A | 8/1964 | Lyons | |
| 3,156,281 A | 11/1964 | Demi | |
| 3,197,243 A | 7/1965 | Brenneke | |
| 3,233,497 A | 2/1966 | McCormick | |
| 3,396,554 A | 8/1968 | Westercamp | |
| 3,494,676 A | 2/1970 | Compton | |
| 3,672,708 A | 6/1972 | Zemberry | |
| 3,700,271 A | 10/1972 | Blaurock et al. | |
| 3,730,569 A | 5/1973 | Feinler | |
| 3,768,845 A * | 10/1973 | Gilliland | 403/372 |
| 3,838,928 A | 10/1974 | Blaurock et al. | |
| 3,861,815 A | 1/1975 | Landaeus | |
| 3,976,340 A * | 8/1976 | Pitner | 384/581 |
| 4,069,618 A | 1/1978 | Geiss | |
| 4,222,310 A | 9/1980 | Garrett et al. | |

(Continued)

FOREIGN PATENT DOCUMENTS

DE 916370 8/1954

(Continued)

*Primary Examiner*—Joshua T Kennedy (57) ABSTRACT

A tolerance ring configured to prevent interlocking during shipping and handling. The tolerance ring has a cylinder with a first radius about an axis of rotation and a gap in the cylinder surface having a first edge and second edge extending along the axis. The gap in the cylindrical base has a first tab on the first edge and a second tab on the second edge. The first tab is adapted for coupling to the second tab and thereby prevents the interlocking of one tolerance ring with another. The gap can be configured to be non-linear.

10 Claims, 11 Drawing Sheets

U.S. PATENT DOCUMENTS

| | | |
|---|---|---|
| 4,286,894 A | 9/1981 | Rongley |
| 4,772,139 A * | 9/1988 | Bretton .................. 384/537 |
| 4,790,683 A | 12/1988 | Cramer, Jr. et al. |
| 4,801,230 A * | 1/1989 | Wilburn ..................... 411/61 |
| 4,828,423 A | 5/1989 | Cramer, Jr. et al. |
| 4,981,390 A * | 1/1991 | Cramer et al. ............. 403/371 |
| 5,125,755 A | 6/1992 | Adler et al. |
| 5,575,691 A | 11/1996 | Matthews |
| 5,613,265 A | 3/1997 | Gemmell |
| 5,647,766 A | 7/1997 | Nguyen |
| 6,163,441 A | 12/2000 | Wood et al. |
| 6,288,878 B1 | 9/2001 | Misso et al. |
| 6,288,879 B1 | 9/2001 | Misso et al. |
| 6,333,839 B1 | 12/2001 | Misso et al. |
| 6,411,472 B1 | 6/2002 | Allsup |
| 6,480,363 B1 | 11/2002 | Prater |
| 6,525,910 B1 | 2/2003 | Macpherson et al. |
| 6,527,449 B1 | 3/2003 | Koyama et al. |
| 6,603,636 B2 | 8/2003 | Schwandt et al. |
| 6,606,224 B2 | 8/2003 | Macpherson et al. |
| 6,889,956 B2 | 5/2005 | Gutierrez et al. |
| 7,085,108 B1 | 8/2006 | Oveyssi et al. |
| 7,118,181 B2 * | 10/2006 | Frear ......................... 299/104 |
| 7,149,281 B2 * | 12/2006 | Lacherade et al. .......... 378/132 |
| 2002/0024770 A1 | 2/2002 | Hong et al. |
| 2003/0156357 A1 | 8/2003 | Brink et al. |
| 2004/0145830 A1 | 7/2004 | Brink et al. |
| 2004/0238944 A1 | 12/2004 | Bish et al. |
| 2005/0225903 A1 * | 10/2005 | Sprankle et al. .......... 360/264.3 |

FOREIGN PATENT DOCUMENTS

| | | |
|---|---|---|
| DE | 1 855 948 | 8/1962 |
| DE | 29 50 985 | 12/1979 |
| EP | 1 067 336 | 1/2001 |
| FR | 2 627 620 | 12/1988 |
| GB | 1094610 | 6/1965 |
| GB | 1297599 | 4/1971 |
| GB | 1386738 | 2/1973 |
| GB | 2382386 | 5/2003 |
| GB | 2413594 | 11/2005 |
| GB | 2413608 | 11/2005 |
| JP | 2003-518592 | 6/2003 |
| JP | 2003-522912 | 7/2003 |
| JP | 2005-114025 | 4/2005 |
| WO | WO 01/41136 | 6/2001 |
| WO | WO 03/025907 | 3/2003 |
| WO | WO 2005/106268 | 11/2005 |
| WO | WO 2006/056731 | 6/2006 |

* cited by examiner

TOLERANCE RING HAVING VARIOUS END TAB DESIGNS TO PREVENT INTERLOCKING

BACKGROUND OF THE INVENTION

1. Field of the Invention

This invention relates generally to bearing tolerance rings. More particularly, the invention pertains to tolerance rings used in cartridge bearings for actuator arms in information storage devices, such as hard disk drives.

2. Description of Related Art

A key component of any computer system is a device to store data. One common place for storing massive amounts of data in a computer system is on a disc drive. The most basic parts of a disc drive are a disc that is rotated, an actuator that moves a transducer to various locations on the disc, and electrical circuitry that is used to write and read data to and from the disc. Coupled to the actuator is a head-gimbal assembly (HGA) that includes a head and metal suspension. The HGA's can be stacked together into a head-stack assembly (HSA), which is propelled across the disk surface by the actuator. There are a variety of disc drives in use today, such as hard disc drives, zip drives, floppy disc drives. All utilize either rotary or linear actuators.

In hard disk drives, magnetic heads read and write data on the surfaces of rotating disks that are co-axially mounted on a spindle motor. The magnetically-written bits of information are laid out in concentric circular tracks on the surfaces of the disks. The disks must rotate quickly so that the computer user does not have to wait long for a desired bit of information on the disk surface to become positioned under the head. In modern disk drives, data bits and tracks must be extremely narrow and closely spaced to achieve a high density of information per unit area of the disk surface.

The required small size and close spacing of information bits on the disk surface have consequences on the design of the disk drive device and its mechanical components. Among the most important consequences is that the magnetic transducer on the head must operate in extremely close proximity to the magnetic surface of the disk. Because there is relative motion between the disk surface and the magnetic head due to the disk rotation and head actuation, continuous contact between the head and disk can lead to tribological failure of the interface. Such tribological failure, known colloquially as a "head crash," can damage the disk and head, and usually cause data loss. Therefore, the magnetic head is designed to be hydrodynamically supported by an extremely thin air bearing so that its magnetic transducer can operate in close proximity to the disk while physical contact between the head and the disk is minimized or avoided. Typically, the head-to-disk spacing present during operation of modern hard disk drives is extremely small, measuring in the tens of nanometers.

Characteristics of the actuator used for moving the magnetic transducer in close proximity to the disk must be considered by the designer to minimize vibration in response to rapid angular motions and other excitations. For example, the actuator arm must be stiff enough and the actuator pivot bearing must be of high enough quality so that the position of the head can be precisely controlled during operation. Also, the interface between the actuator arm and the pivot bearing must be of sufficient rigidity and strength to enable precise control of the head position during operation and to provide the boundary conditions necessary to facilitate higher natural resonant frequencies of vibration of the actuator arm. Typically, the actuator arm is fabricated from aluminum or an alloy of aluminum and is therefore softer and more easily scratched than the pivot bearing sleeve, which is typically fabricated from stainless steel.

The stiffness of the actuator must also be sufficient to limit deflection that might cause contact with the disk during mechanical shock events. Likewise, the interface between the actuator structure and the pivot bearing must be of sufficient strength to prevent catastrophic structural failure such as axial slippage between the actuator arm and the actuator pivot bearing sleeve during large mechanical shock events.

In many disc drives, the actuator arm or arms are fixed to the actuator pivot bearing by a tolerance ring. Typically, tolerance rings include an open cylindrical base portion and a plurality of contacting portions that are raised or recessed from the cylindrical base portion. The contacting portions are typically partially compressed during installation to create a radial preload between the mating cylindrical features of the parts joined by the tolerance ring. The radial preload compression provides frictional engagement that prevents actual slippage of the mating parts. For example, in disc drive applications, the radial compressive preload of the tolerance ring prevents separation and slippage at the interface between the actuator arm and the pivot bearing during operation and during mechanical shock events. The tolerance ring also acts as a radial spring. In this way, the tolerance ring positions the interior cylindrical part relative to the exterior cylindrical part while making up for radii clearance and manufacturing variations in the radius of the parts.

Additional features have been added to tolerance rings to obtain specific advantages. For example, in U.S. Pat. No. 6,288,878 to Misso et al., circumferential brace portions were added to the tolerance ring to increase hoop strength. U.S. Pat. No. 6,338,839 to Misso et al. discloses a tolerance ring which provides a low consistent installation force profile.

U.S. Pat. No. 4,790,683 to Cramer, Jr. et al. discloses the use of a conventional tolerance ring in conjunction with a cylindrical shim in applications characterized by structurally significant radial vibration or loading. The shim prevents deformation of the soft underlying material and thereby prevents undesirable partial relief of the radial compression that maintains frictional engagement of the tolerance ring.

Figure 1:
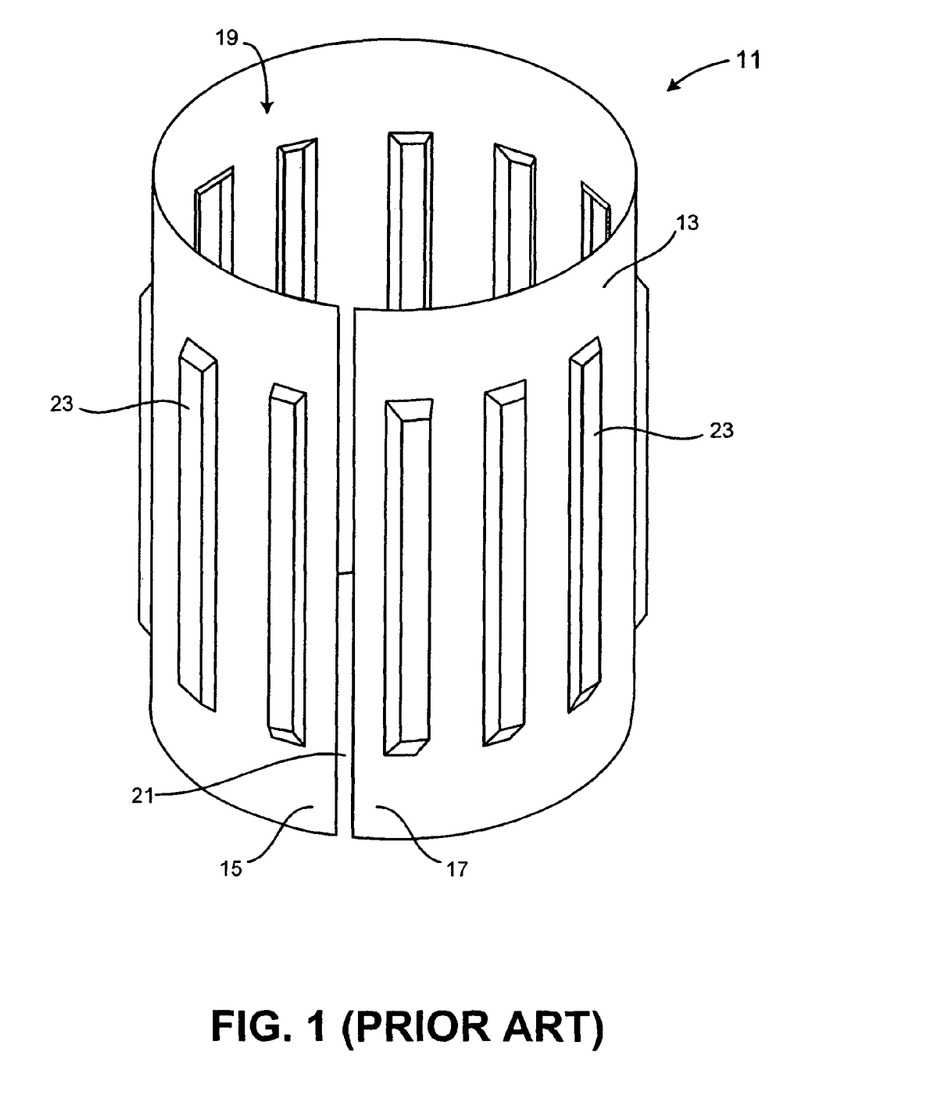
FIG. 1 is a perspective view of a prior art tolerance ring.

State of the art tolerance rings are typically manufactured from a flat metal sheet with stamping, forming, rolling, and other steps to provide ways to recess contacting portions and a final generally cylindrical shape. A perspective view of a prior art tolerance ring is illustrated in FIG. 1. Because of the way tolerance rings are manufactured, they typically have a gap or spacing formed where the opposite edges of the rolled metal sheet meet. This gap or spacing allows tolerance rings to interlock during shipping and handling. Separating interlocked tolerance rings is a labor intensive, time consuming effort that is expensive and subjects the tolerance rings to damage.

With an increasing demand for improved consistency in installing the actuator arm in a hard disk, there remains a continuing need in the art for a tolerance ring design that prevents interlocking during shipping and handling. It is to such improvements that the present invention is directed.

SUMMARY OF THE INVENTION

A tolerance ring having a cylinder with a predetermined length between two ends, and a gap along the predetermined length of the cylinder. The gap has a first and a second edge. Protruding from the first edge of the gap is a first tab that overlaps the second edge. A second tab may protrude from the second edge of the gap to couple with the first tab. The first tab may have a hook-shaped end that couples to a hook-shaped end on the second tab. The first tab may be configured so that it is engageable with an aperture in the second edge of the gap. The tab configuration may have a cavity or aperture to account for mass eccentricity of the tolerance ring as required. The tab may be configured into an alternate L-shaped or U-shaped flange that hooks into the opening of an aperture in the opposite edge of the gap or an aperture in an opposing tab. The tabs may be configured to engage each other. In another embodiment, a non-linear gap is formed from one end of the cylinder to the other end.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

FIG. 1 illustrates a perspective view of a prior art tolerance ring design 11. In one embodiment, the tolerance ring 11 is made from 300 Series stainless steel. The tolerance ring 11 is formed from a substantially planar base portion that is curved to form a cylinder 13. The cylinder 13 has a first radius about a central axis and extends for a fixed length parallel to the central axis.

Radial expansion and contraction of cylindrical opening 19 is facilitated by a gap 21 along the length of tolerance ring 11, the gap 21 having a first edge 17 and a second edge 15. This gap 21 allows tolerance rings to readily interlock during shipping and handling because a cylinder 13 of one tolerance ring 11 can enter through the gap 21 and into the cylindrical opening 19 of another tolerance ring 11. Separating interlocked tolerance rings 11 is time consuming, expensive and may subject the tolerance rings 11 to handling damage.

The tolerance ring 11 has a plurality of contacting portions 23. The contacting portions 23 generally have a rhomboidal cross-sectional shape extending axially along the cylinder 13. As shown in FIG. 1, the contacting portions 23 project radially outward in a direction away from the interior of the tolerance ring 11. It is recognized that alternative configurations known in the art include tolerance rings with contacting portions 23 that project radially inward or project inward and outward in an alternating fashion.

Figure 2:
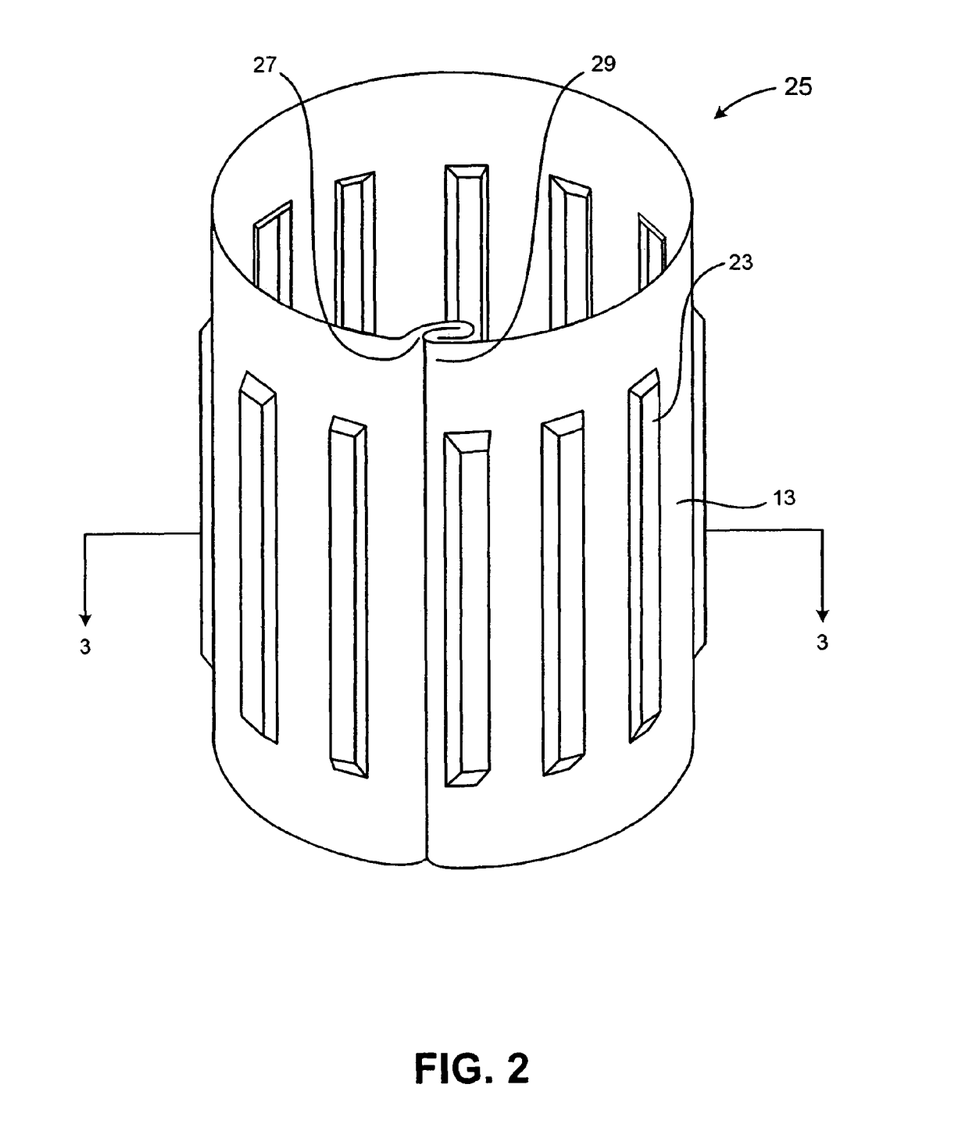
FIG. 2 is a perspective view of a tolerance ring according to one embodiment of the present invention.
Figure 3:
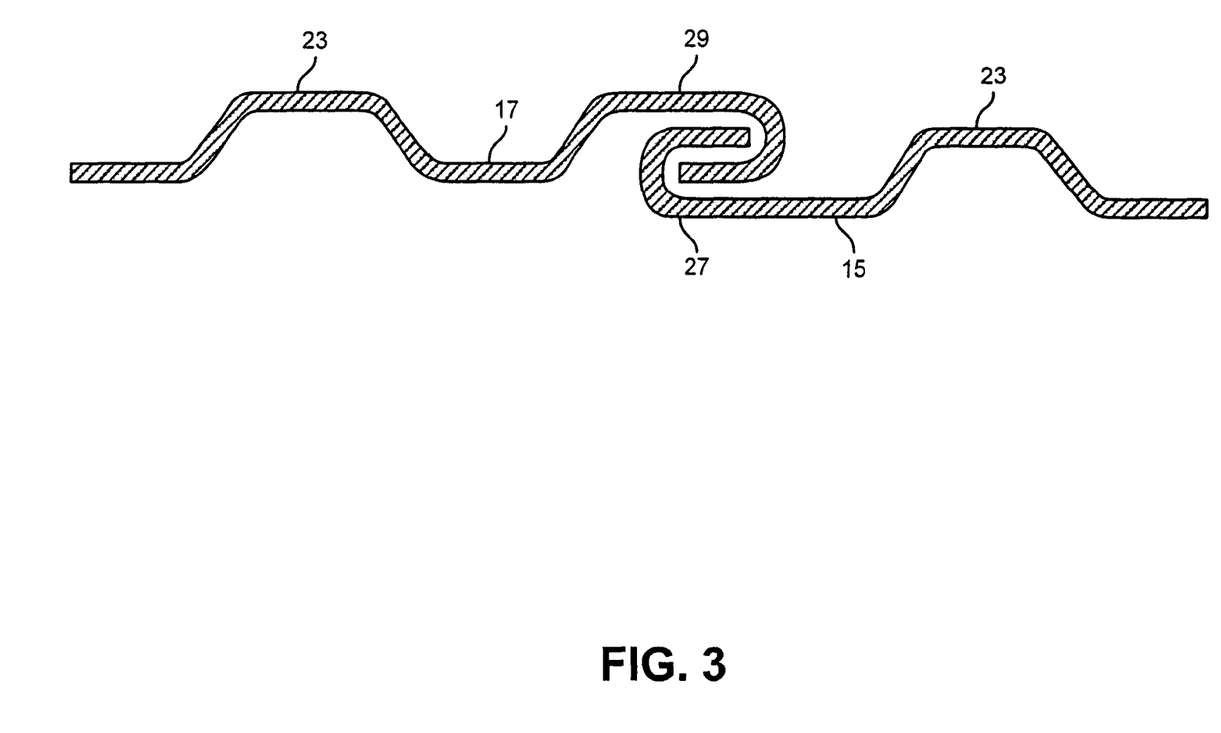
FIG. 3 is a cross-sectional view of the tolerance ring along line 3-3 of FIG. 2.

FIG. 2 is a perspective view of a tolerance ring 25 that prevents interlocking during shipping and handling according to one embodiment of the present invention. The tolerance ring 25 has hook-shaped tabs 27 and 29 with opposite mating ends. These ends interlock with one another to close the gap 21 formed between the edges 27 and 29. FIG. 3 is a cross-sectional view of the tolerance ring 25 along line 3-3 of FIG. 2, illustrating this interlocking tab feature. By eliminating the gap 21, tolerance ring 25 cannot tangle or interlock with other tolerance rings 25 during shipping and handling.

Figure 4:
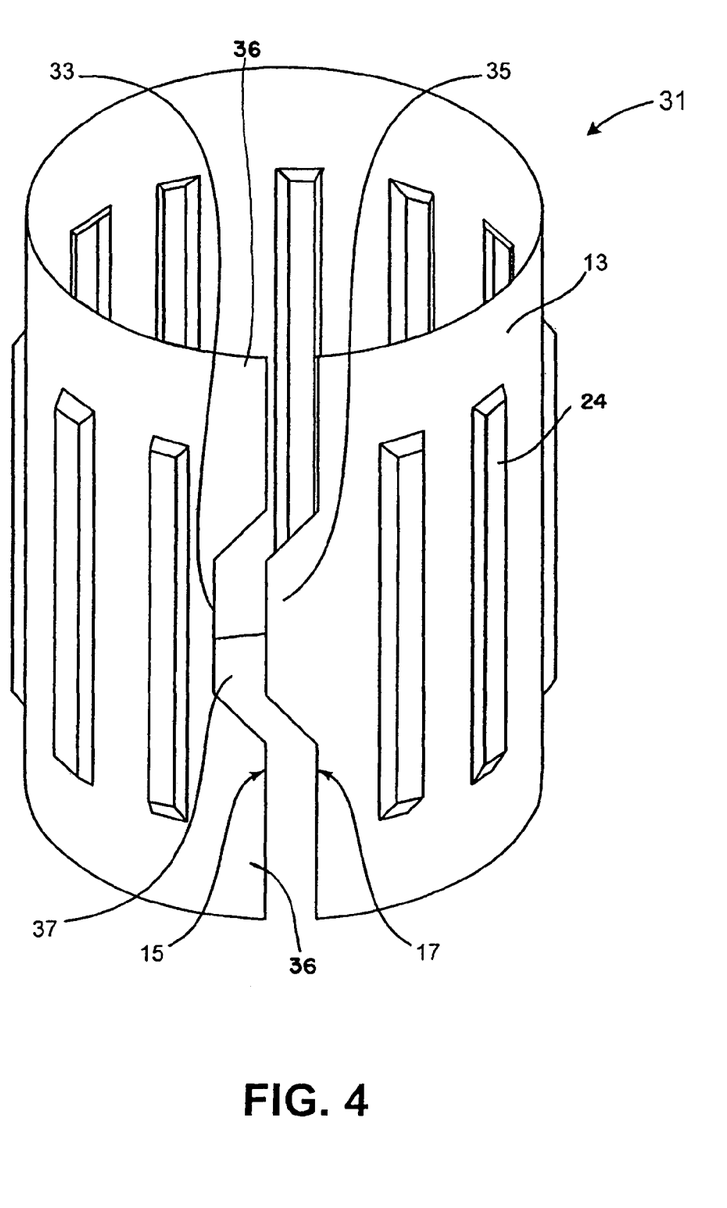
FIG. 4 is a perspective view of a tolerance ring according to another embodiment of the present invention.
Figure 5:
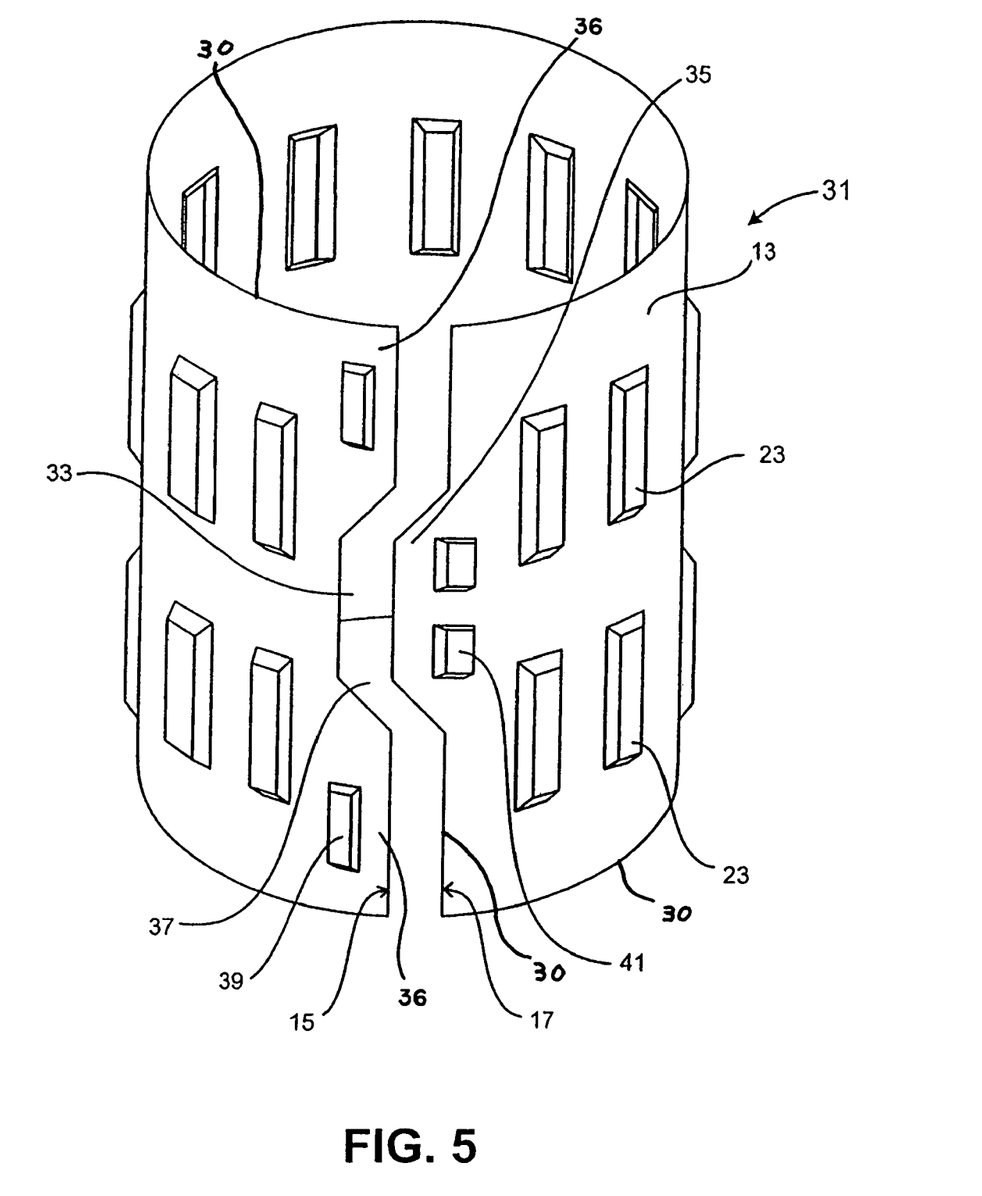
FIG. 5 illustrates a perspective view of a tolerance ring according to yet another embodiment of the present invention.

FIGS. 4 and 5 illustrate perspective views of a tolerance ring 31 that prevents interlocking during shipping and handling using a non-linear gap configuration 37 according to one embodiment of the present invention. The non-linear gap configuration 37 is formed between edges 15 and 17. Edge 17 has a tab 35 that can mate with a recess 33 in edge 15. Recess 33 in edge 15 forms two secondary tabs 36 on either side of recess 33 in edge 15. Separate tabs 36 are formed by recess 33. It can be envisioned that edges 15 and 17 can have different mating or reciprocal configurations that result in a non-linear gap configuration 37 between them. For example, the non-linear gap configuration 37 can be envisioned to diagonally, traverse the axial width of cylinder 13 or be configured as a semi-circular gap between edges 15 and 17. The edges 15 and 17 define the perimeter 30 of the outer surface of the cylinder 13. The perimeter 30 is the outermost boundary of the cylindrical surface, extending continuously along both sides of the non-linear gap 37 and around the two circular ends of the cylinder 13. In other words, if the cylinder 13 was separated along the non-linear gap 37 and unfolded into a planar sheet, edges 15 and 17 would comprise two ends of the planar sheet, the two edges 15 and 17 defining the perimeter 30 of the cylinder 13.

Since the non-linear gap 37 affects the spacing and orientation of contacting portions 23, additional or secondary contacting portions of various dimensions can be used. FIG. 5 illustrates a tolerance ring 31 that prevents interlocking during shipping and handling using a non-linear gap configuration 37, having a plurality of secondary contacting portions 39 and 41 within close proximity to the non-linear gap configuration 37. As shown in FIG. 5, the secondary contacting portions 39 and 41 may be located between the gap 37 and the plurality of primary contacting portions 23. For example, the secondary contacting portions 41 may be located on the first tab 35 on edge 17, and the secondary contacting portions 39 may be located on secondary tabs 36 on edge 15 and axially aligned with the recess 33 in edge 15, as shown. These secondary contacting portions 39 and 41 improve the radial preload between mating cylindrical features of the actuator arm assembly across the non-linear gap 37. The radial preload compression provides frictional engagement that prevents actual slippage of the mating parts. Another advantage of having a plurality of secondary contacting portions 39 and 41 close to the non-linear gap 37 is to reduce mass eccentricity, or mass imbalance, of the tolerance ring 31.

FIG. 5 also illustrates an alternate configuration for contacting portions 23, 39 and 41, different from the configuration of the contacting portions 24 shown in FIG. 4. Primary contacting portions 23 are arranged in a plurality of rows along the surface of the cylinder 13, while secondary contacting portions 39 and 41 are not aligned with any of these rows. The rows extend circumferentially around the axis of the cylinder 13, meaning the primary contacting portions 23 are aligned in circles extending around the axis of the cylinder. FIG. 5 illustrates two rows of primary contacting portions extending circumferentially around the axis of the cylinder 13. The secondary contacting portions 39 and 41 are not aligned circumferentially with either of the rows shown in FIG. 5. Contacting portions 23, 39 and 41 generally have a rhomboidal cross-sectional shape extending axially along the cylinder 13. The contacting portions 23, 39 and 41 project radially outward in a direction away from the interior of the tolerance ring 11. It is recognized that alternative configurations known in the art include tolerance rings with contacting portions 23, 39 and 41 that project radially inward, or project inward, and outward in an alternating fashion.

Figure 6:
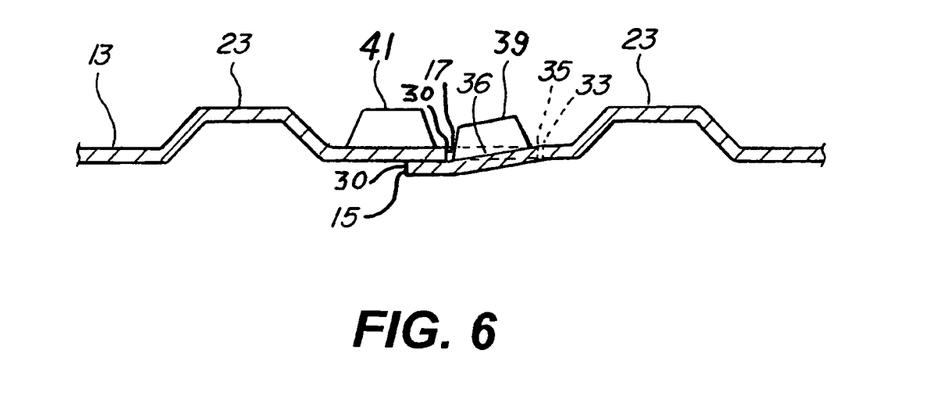
FIG. 6 illustrates a cross-sectional view of the tolerance ring along line 6-6 of FIGS. 4 and 5.
Figure 7:
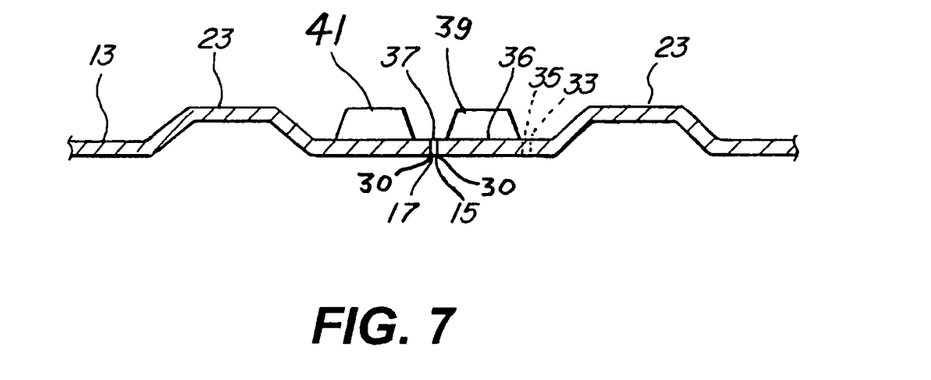
FIG. 7 is illustrates a cross-sectional view of the tolerance ring along line 6-6 of FIGS. 4 and 5, illustrating an alternate interlocking tab feature.

FIGS. 6 and 7 illustrate alternate embodiments in cross-section of the possible engagement of the edges 15, 17 of tolerance ring 31. In the embodiment of FIG. 7, the edges 15 and 17 close the non-linear gap 37 formed therebetween. FIG. 6 shows the secondary tab 36 on edge 15 radially overlapping a portion of the edge 17, while the protruding tab 35 on edge 17 overlaps the recess 33. This would be the configuration before the tolerance ring 31 is expanded to fit over an actuator arm. As shown in FIG. 7, the edges 15 and 17 meet along the perimeter 30 of the cylinder 13. FIG. 7 shows the protruding tab 35 and recess 33 by dashed-lines within the same plane as the cylinder 13. By utilizing the non-linear gap configuration 37, tolerance rings 31 do not tangle or interlock with each other during shipping and handling.

Figure 8:
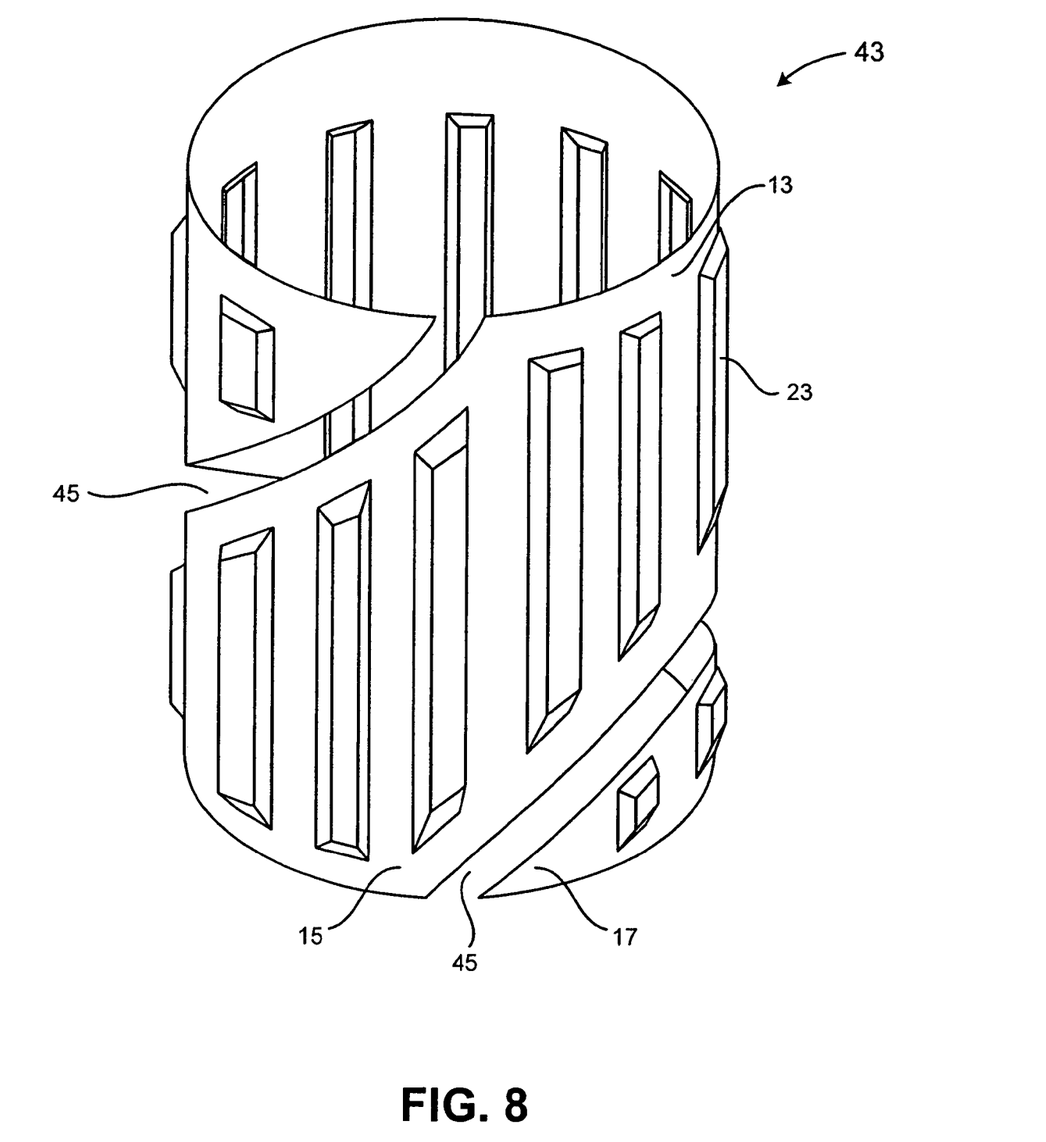
FIG. 8 is a perspective view of a tolerance ring according to a further another embodiment of the present invention.

FIG. 8 is a perspective view of a tolerance ring 43 that prevents interlocking during shipping and handling using a helical gap 45. The edges 15 and 17 are angled to allow a helical gap 45 to diagonally traverse around the axial width of the cylinder 13. By utilizing this helical gap 45 configuration, tolerance rings 43 do not tangle or interlock with each other during shipping and handling.

Figure 9:
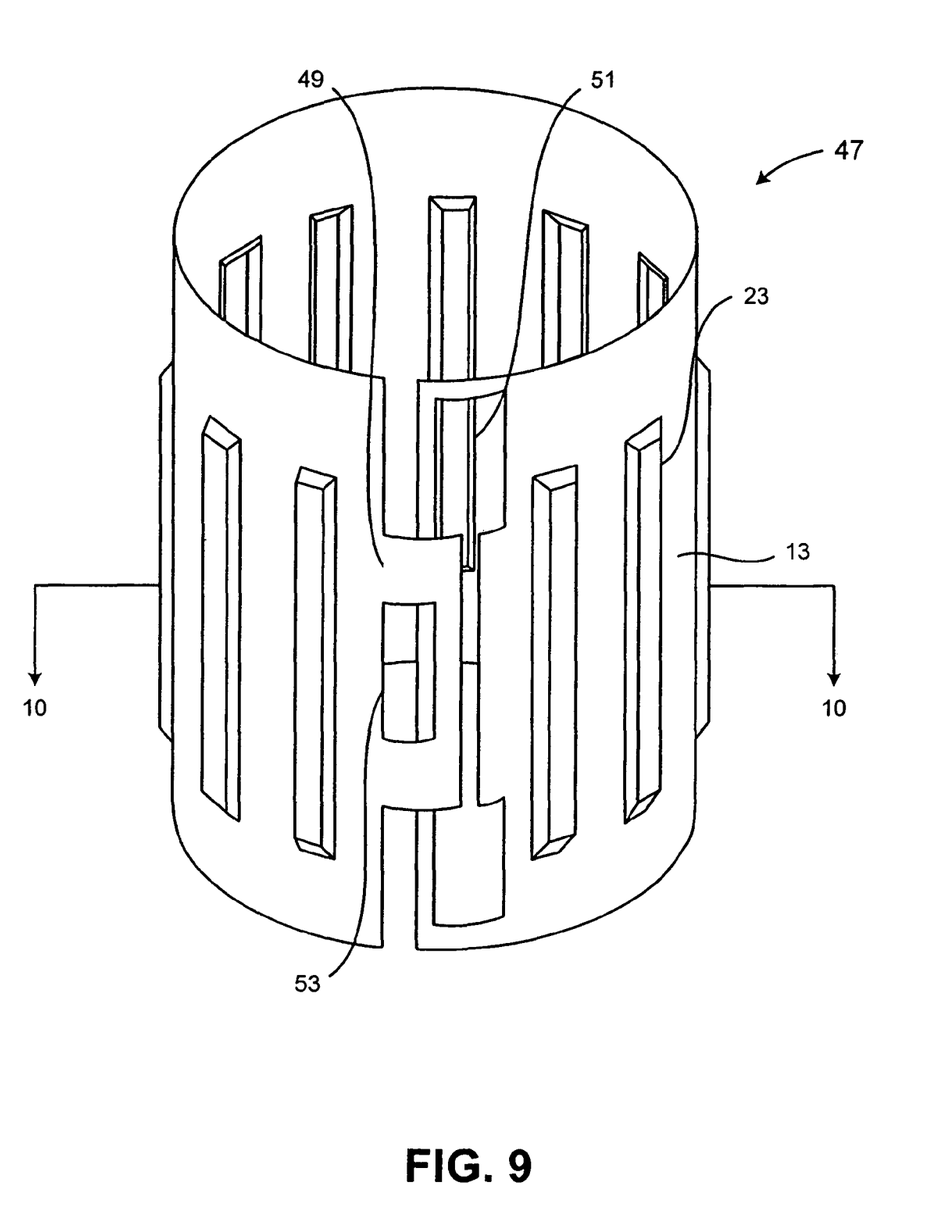
FIG. 9 is a perspective view of a tolerance ring according to still another embodiment of the present invention.

FIG. 9 is a perspective view of a tolerance ring 47 that prevents interlocking during shipping and handling using a tab 49 and an aperture 51. The aperture 51 is an opening formed in the cylinder 13 that is at least large enough to receive the tab 49 on the opposite end. The tab 49 has a cavity or opening 53 designed to account for mass eccentricity of the tolerance ring 47. It can be envisioned that the tab 49 can have any configuration that is receivable by a mating aperture 51 on the opposite end.

Figure 10:
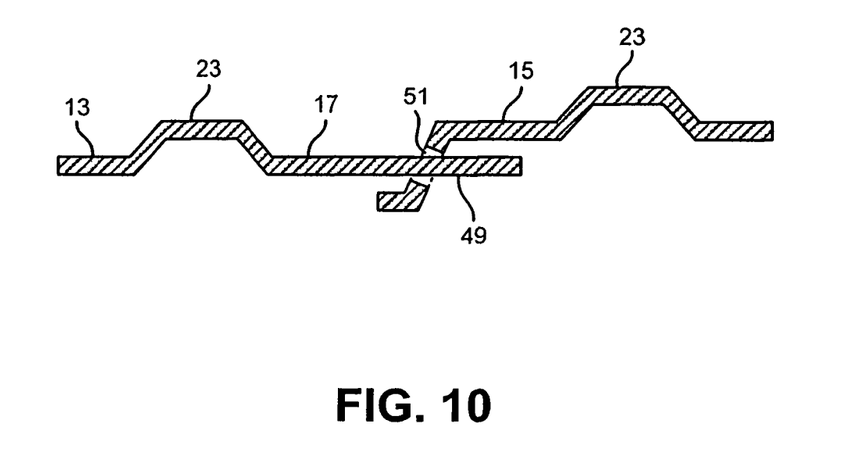
FIG. 10 illustrates a cross-sectional view of the tolerance ring along line 10-10 of FIG. 9.
Figure 11:
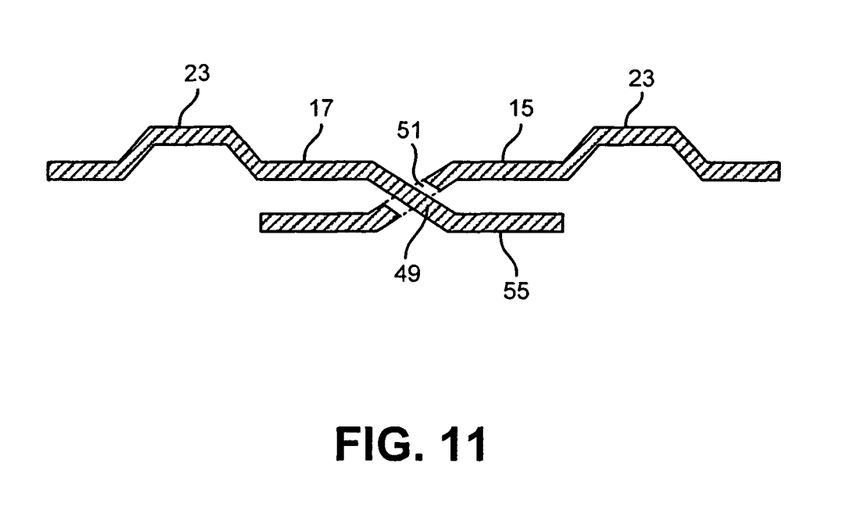
FIG. 11 illustrates a cross-sectional view of the tolerance ring along line 10-10 of FIG. 9, illustrating an alternative interlocking feature.

FIGS. 10 and 11 illustrate alternate cross-sectional views of the tolerance ring 47 along line 10-10 of FIG. 9. The tab 49 is removably engageable with aperture 51. FIG. 10 shows a tab 49 configuration planar to the cylinder 13. FIG. 10 provides an alternate tab 49 configuration with a flange 55 to securely couple the tab 49 to the aperture 51. By eliminating the gap 21, tolerance ring 47 does not tangle or interlock with other tolerance rings 47 during shipping and handling.

Figure 12:
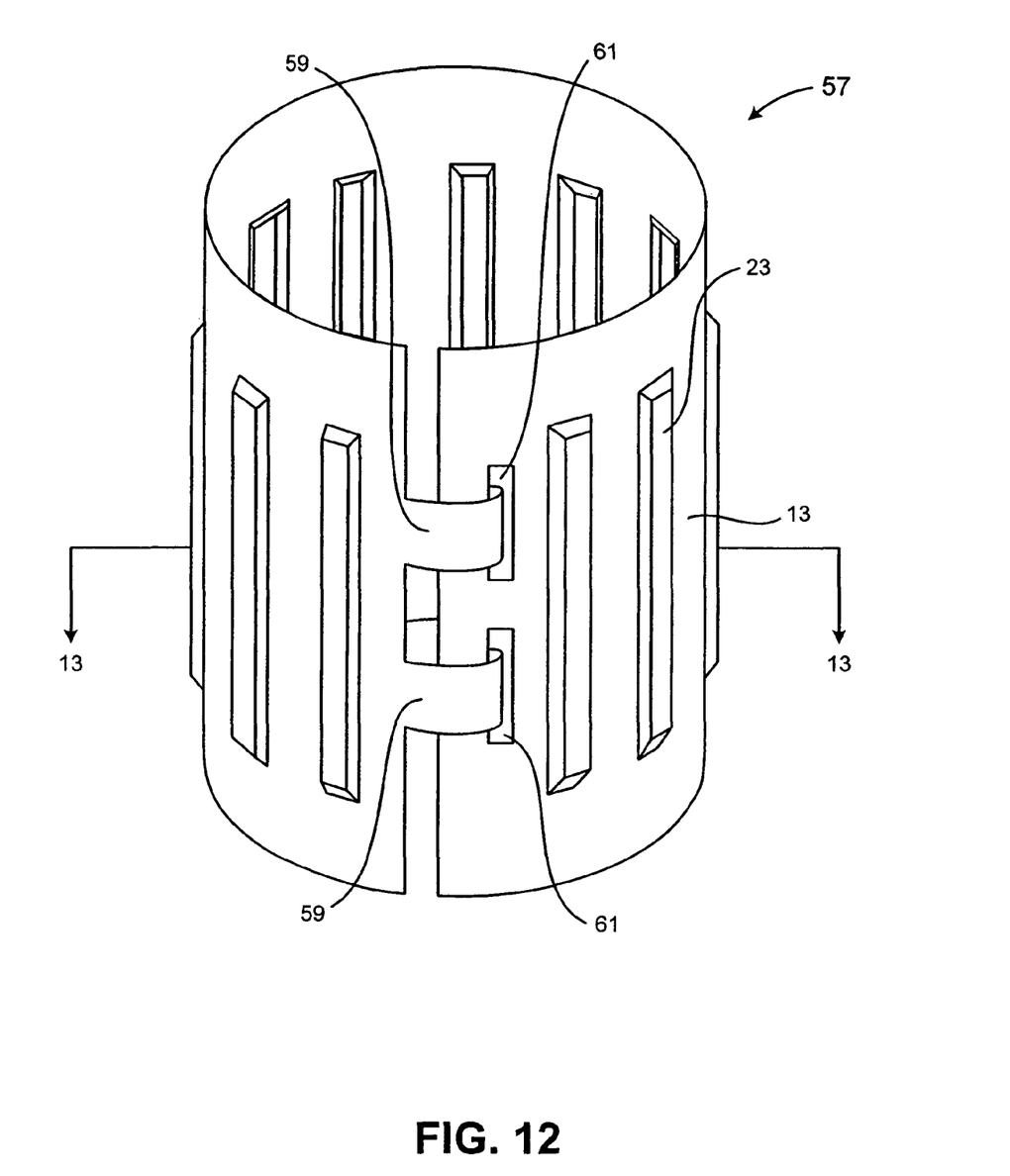
FIG. 12 is a perspective view of a tolerance ring according to yet a further embodiment of the present invention.
Figure 13:
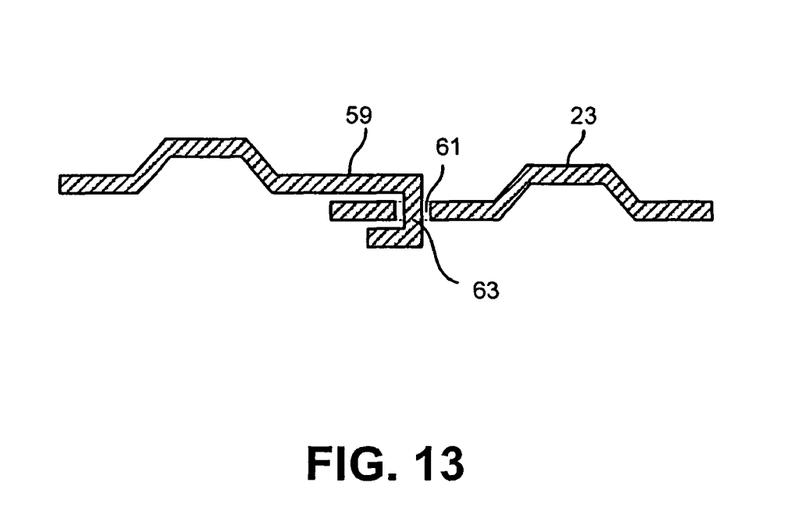
FIG. 13 illustrates a cross-sectional view of the tolerance ring along line 13-13 of FIG. 12.
Figure 14:
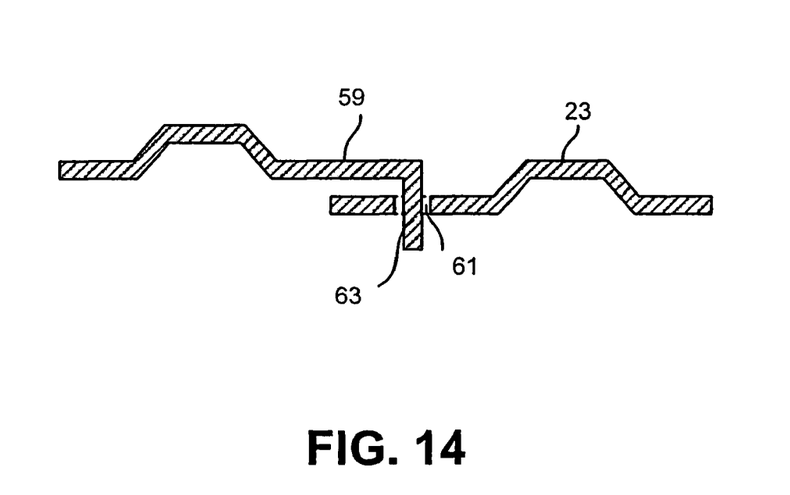
FIG. 14 illustrates a cross-sectional view of the tolerance ring along line 13-13 of FIG. 12, illustrating an alternative interlocking feature.

It is recognized that alternative tab and aperture configurations can be used to eliminate the gap 21. For example, the tolerance ring 47 can have a plurality of tabs that mate with a plurality of apertures. FIG. 12 shows a perspective view of a tolerance ring 57 with two tabs 59 that are removably engageable with two apertures 61. The tabs 59 can mate with apertures 61 in the same manner as explained in FIGS. 10 and 11, or the tabs 59 can clip or hook into the apertures 61, as shown in FIGS. 13 and 14. The tabs 59 can have an L-shaped or U-shaped flange 63 that hook on one edge of the opening of apertures 61. Like the other embodiments of the present invention, by eliminating the gap 21, tolerance ring 57 avoids entanglement or interlocking with other tolerance rings 57 during shipping and handling.

It is understood by a person skilled in the art that any combination of the embodiments described herein can be used without departing from the purpose of the present invention. For example, a tolerance ring using non-linear gap configuration 37 can be used in combination with a tab 49 and aperture 51. Similarly, the tolerance ring using non-linear gap configuration 37 can be used in combination with a plurality of tabs 59 and a plurality of apertures 61. The tolerance ring using non-linear gap configuration 37 can also be used along with hook-shaped tabs 27 and 29. All combinations of the described embodiments can be used to prevent the interlocking of one tolerance ring with another.

What is claimed is:

1. A tolerance ring, comprising:
    a cylinder having a central axis of rotation, an outer surface with a predetermined length between two ends and a gap along the predetermined length of the cylinder, the gap having a first edge and a second edge, the first edge and the second edge each extending from the two ends longitudinally along a portion of the gap and defining the perimeter of the outer surface of the cylinder, the first edge and the second edge being parallel to each other and parallel to the central axis of the cylinder;
    a first tab protruding from the first edge and sized to radially overlap the second edge when the first edge and the second edge are in proximity;
    a recess in the second edge sized to receive the first tab and defining secondary tabs along the second edge on opposite sides of the recess;
    a plurality of primary contacting portions, each primary contacting portion projecting radially outward from the outer surface of the cylinder; and
    one or more secondary contacting portions on the surface of the first tab.

2. The tolerance ring of claim 1, wherein the secondary contacting portions project radially outward from the outer surface of the cylinder.

3. The tolerance ring of claim 1 wherein the secondary contacting portions vary in size from the primary contacting portions, the secondary contacting portions being sized to reduce mass eccentricity of the tolerance ring.

4. The tolerance ring of claim 1 wherein the primary contacting portions are arranged in a plurality of rows with each row extending circumferentially around the central axis of the cylinder, and the secondary contacting portions on the first tab are not aligned circumferentially with the plurality of rows.

5. The tolerance ring of claim 1 further comprising one or more secondary contacting portions located on the secondary tab.

6. The tolerance ring of claim 1 wherein at least one of the secondary contacting portions is axially aligned with the recess in the second edge.

7. A tolerance ring, comprising:
    a cylinder having a central axis of rotation, an outer surface with a predetermined length between two ends and a gap along the predetermined length of the cylinder, the gap having a first edge and a second edge, the first edge and the second edge each extending from the two ends longitudinally along a portion of the gap and defining the perimeter of the outer surface of the cylinder, the first edge and the second edge being parallel to each other and to the central axis of the cylinder;

a first tab protruding from the first edge and sized to radially overlap the second edge when the first edge and the second edge are in proximity;

secondary tabs protruding from the second edge defining a recess on the second edge configured to receive the first tab;

a plurality of primary contacting portions projecting radially outward from the outer surface of the cylinder; and one or more secondary contacting portions on the surface of the first tab.

8. The tolerance ring of claim 7 wherein the plurality of primary contacting portions are arranged in a plurality of rows with each row extending circumferentially around the central axis of the cylinder.

9. The tolerance ring of claim 8 where the secondary contacting portions on the first tab are not aligned circumferentially with the plurality of rows of the primary contacting portions.

10. The tolerance ring of claim 9 wherein the secondary contacting portions vary dimensionally from the primary contacting portions, the secondary contacting portions having dimensions that reduce mass eccentricity of the tolerance ring.

* * * * *